US010845668B2

(12) United States Patent
Ogiso et al.

(10) Patent No.: US 10,845,668 B2
(45) Date of Patent: Nov. 24, 2020

(54) IQ OPTICAL MODULATOR

(71) Applicant: NIPPON TELEGRAPH AND TELEPHONE CORPORATION, Tokyo (JP)

(72) Inventors: Yoshihiro Ogiso, Atsugi (JP); Josuke Ozaki, Atsugi (JP); Yuta Ueda, Atsugi (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 0 days.

(21) Appl. No.: 16/494,672

(22) PCT Filed: Mar. 20, 2018

(86) PCT No.: PCT/JP2018/011156
§ 371 (c)(1),
(2) Date: Sep. 16, 2019

(87) PCT Pub. No.: WO2018/174083
PCT Pub. Date: Sep. 27, 2018

(65) Prior Publication Data
US 2020/0026145 A1    Jan. 23, 2020

(30) Foreign Application Priority Data
Mar. 22, 2017 (JP) ................ 2017-056626

(51) Int. Cl.
G02F 1/225        (2006.01)
G02F 1/01         (2006.01)
(Continued)

(52) U.S. Cl.
CPC ............ *G02F 1/2255* (2013.01); *G02F 1/011* (2013.01); *G02F 1/2257* (2013.01);
(Continued)

(58) Field of Classification Search
None
See application file for complete search history.

(56) References Cited

U.S. PATENT DOCUMENTS

| 5,787,211 A | 7/1998 | Gopalakrishnan |
| 9,310,663 B2 | 4/2016 | Velthaus |
| (Continued) | | |

FOREIGN PATENT DOCUMENTS

| CN | 102164017 A | 8/2011 |
| EP | 2 782 270 A1 | 9/2014 |
| (Continued) | | |

OTHER PUBLICATIONS

R. Kaiser et al. Monolithic flip-chip compatible twin-IQ Mach-Zehnder modulators for hybrid assembly onto high capacity optical transmitter boards. 23rd International Conference on Indium Phosphide and Related Materials (IPRM 2011), May 2011. (Year: 2011).*

(Continued)

*Primary Examiner* — Michael Stahl
(74) *Attorney, Agent, or Firm* — Workman Nydegger

(57) ABSTRACT

An IQ optical modulator including: a parent Mach-Zehnder type (MZM) optical waveguide; child MZM optical waveguides constituting two arms of the parent MZM; two electrode transmission lines provided along the two arms of the child MZM, respectively, and receiving modulation signal to phase-modulate an optical signal; an RF extension line connected to the two electrode transmission lines, respectively; a first optical splitter branching light into the two arms of the parent MZM; a second optical splitter branching light into the two arms of the child MZM; and a first optical multiplexer multiplexing light from the two arms of the child MZM, wherein stripe direction of the child MZM optical waveguide is same as the RF extension line, (Continued)

the second optical splitter, and the first optical multiplexer, and is orthogonal to the first optical splitter.

4 Claims, 10 Drawing Sheets

(51) Int. Cl.
*H04B 10/548* (2013.01)
*H04B 10/079* (2013.01)
*G02F 1/21* (2006.01)

(52) U.S. Cl.
CPC ..... *H04B 10/07955* (2013.01); *H04B 10/548* (2013.01); *G02F 2001/212* (2013.01); *G02F 2201/12* (2013.01)

(56) References Cited

U.S. PATENT DOCUMENTS

| | | | |
|---|---|---|---|
| 2010/0232737 | A1 | 9/2010 | Sugiyama et al. |
| 2010/0266234 | A1 | 10/2010 | Kinpara et al. |
| 2013/0011093 | A1* | 1/2013 | Goh ............... G02F 1/0121 385/3 |
| 2013/0142521 | A1 | 6/2013 | Dispenza et al. |
| 2014/0133794 | A1* | 5/2014 | Kono ............... G02F 1/225 385/3 |
| 2015/0293427 | A1 | 10/2015 | Goi et al. |
| 2016/0054639 | A1* | 2/2016 | Kono ............... G02F 1/2255 385/2 |
| 2016/0282699 | A1 | 9/2016 | Gottwald et al. |
| 2017/0146886 | A1 | 5/2017 | Saito et al. |

FOREIGN PATENT DOCUMENTS

| | | |
|---|---|---|
| JP | 4235154 B2 | 12/2008 |
| JP | 2010-217427 A | 9/2010 |
| JP | 2010-237629 A | 10/2010 |
| JP | 2014112219 A | 6/2014 |
| TW | 304317 A4 | 5/1985 |
| WO | 2014/104309 A1 | 7/2014 |
| WO | 2016/021163 A1 | 2/2016 |

OTHER PUBLICATIONS

Taiwanese Office Action dated Oct. 30, 2018, issued in TW Application No. 107109471.
International Search Report dated Jun. 5, 2018, issued in PCT Application No. PCT/JP2018/011156, filed Mar. 20, 2018.
International Preliminary Report on Patentability dated Oct. 3, 2019, issued in PCT Application No. PCT/JP2018/011156, filed Mar. 20, 2018.
Optical Internetworking Forum, *Technology Options for 400G Implementation*, OIF-Tech-Options 400G-01.0, Jul. 2015, pp. 46.
Sophie Lange et al., *Lower Power InP-Based Monolithic DFB-Laser IQ Modulator with SiGe Differential Driver for 32-GBd QPSK Modulation*, Journal of Lightwave Technology, vol. 34, No. 8, Apr. 15, 2016, pp. 1678-1682.
N. Wolf et al., *Electro-Optical Co-Design to Minimize Power Consumption of a 32 GBd Optical IQ-Transmitter Using InP MZ-Modulators*, Compound Semiconductor Integrated Circuit Symposium (CSICS), 2015 IEEE, pp. 4.

* cited by examiner

IQ OPTICAL MODULATOR

TECHNICAL FIELD

The present invention relates to optical modulation. More specifically, the invention relates to an IQ optical modulator that is high-speed and that can operate over a wide band.

BACKGROUND ART

With the advent of an optical communication system having a higher capacity, a high-speed optical modulator has been required that satisfies a sophisticated optical modulation method. A multi-value optical modulator using a digital coherent technique in particular is important to realize a transceiver having a high capacity exceeding 100 Gbps. These multi-value optical modulators are configured to include plural of optical modulators of a Mach-Zehnder interference-type (hereinafter MZM) capable of zero chirp driving, and arranged in a parallel and multistage manner so as to independently modulate amplitudes and phases of optical signals, respectively.

FIG. 1 is a schematic view illustrating the configuration of a typical polarization multiplexing-type IQ optical modulator currently increasingly used in communications networks. The polarization multiplexing-type IQ optical modulator shown in FIG. 1 has a configuration of an optical waveguide structure shown in FIG. 2 including a phase modulation electrode. As shown in FIG. 2, the optical waveguide structure is configured by an MZM (Quad-parallel MZM) in which two MZMs are arranged in parallel so that each arm of a parent MZM 57 is configured by a child MZM 56 to constitute a so-called nesting structure. The child MZM 56 includes a traveling wave-type electrode 62 that receives an RF signal to modulate an optical signal propagating in an optical waveguide and a DC electrode 63 that receives a phase adjustment DC voltage. Each arm of the parent MZM 57 has the child MZM 56 having a subsequent stage portion that includes a DC electrode 64 to receive a phase adjustment DC voltage. The polarization multiplexing-type IQ optical modulator as described above is configured so that an RF signal is inputted to a modulation electrode provided along the child MZM 56 of an optical waveguide configured by dielectric material such as LiNbO3 to thereby generate an electro-optical effect to perform a phase modulation upon two polarized light signals propagating in the optical waveguide of the child MZM 56. The polarization multiplexing-type IQ optical modulator is a type of IQ optical modulators. Optical signals used in the IQ optical modulator are not limited to two polarized light signals. Thus, it is known that a single polarized light signal also may be used. In the case of a single polarized wave, one MZM in the nesting structure is used.

Many of the conventionally-reported IQ optical modulators are configured so that light input and light output as well as optical waveguides comprising modulation electrodes are all formed in the same direction. A high frequency line to input or (output) an RF signal receives power from a direction orthogonal to the light input and output directions and is bent by about 90 degrees within an extension line to supply power to a modulation region. The reason is that light confinement of LiNbO3 constituting the optical waveguide is weak, and thus when the optical input is orthogonal to the high frequency line, bending the high-frequency extension line is preferable than bending the optical waveguide.

Optical transmitters such as optical modulators will be required to provide all of a further higher capacity ("higher speed") and "lower power consumption", and "smaller size". As shown in NPL 1, standardization activities have been increasingly carried out for the next-generation 400G system. In recent years, attention has been increasingly paid on semiconductor material such as InP in particular as a substitute for LiNbO3 from the viewpoints of a smaller size and a higher speed.

In recent years, a semiconductor MZM having a higher speed generally uses a traveling wave-type electrode (distributed constant circuit) as shown in FIG. 1. In order for the traveling wave-type electrode as described above to achieve a higher modulation speed (higher speed), optimization is required mainly for (1) the matching of the characteristic impedances, (2) the speed matching between light waves and microwaves, and (3) the resistance (loss) of a traveling wave transmission line itself. In the case of the current modulation system providing a speed of exceeding 50 giga baud rate, a deterioration of modulation band is mainly caused by (3) the increased resistance. Thus, the reduction of such a loss has been required. The loss (resistance) of the transmission line itself is mainly classified into the resistance caused by semiconductor material constituting a dopant layer of a waveguide pattern part and the resistance of a metal electrode wiring itself.

The objective of providing a lower power consumption is mainly achieved by two approaches. The first approach is (i) the maximized use of the electro-optical effect and the second approach is (ii) the use of a modulation driving method having a high energy efficiency. The first approach of (i) the maximized use of the electro-optical effect includes providing a higher optical confinement (or a higher electric field density) and optimizing an energy band structure for example. Thus, many researches have been made conventionally. However, these optimizations require sophisticated manufacturing facilities. Furthermore, the long-term researches have almost reached the limit of the possible power reduction amount.

On the other hand, researches and developments have been actively made in recent years on (ii) the use of a modulation driving method having a high energy efficiency. Regarding a high-frequency amplifier (RF driver) requiring a high power consumption among optical transmitters in particular, some reports have been made that differential output-type RF drivers having a higher energy efficiency are mounted within the same package to thereby achieve a significant power reduction (e.g., PTL 1, NPL 2).

As described above, in order to achieve an IQ modulator having a further higher speed and a lower power consumption, the most effective approach may be to reduce the electrical loss of the modulator material and to use a differential RF driver.

CITATION LIST

Patent Literature

PTL 1: The specification of U.S. Pat. No. 9,310,663
PTL 2: Japan Patent No. 4235154

Non Patent Literature

NPL 1: Optical internetworking forum "Technology Options for 400G Implementation"
NPL 2: Sophie Lange et al., "Low Power InP-Based Monolithic DFB-Laser IQ Modulator With SiGe Differential Driver for 32-GBd QPSK Modulation" JOURNAL OF LIGHTWAVE TECHNOLOGY, VOL. 34, NO. 8, Apr. 15, 2016

NPL 3: N. Wolf et al., "Electro-Optical Co-Design to Minimize Power Consumption of a 32 GBd Optical IQ-Transmitter Using InP MZ-Modulators" Compound Semiconductor Integrated Circuit Symposium (CSICS), 2015 IEEE

SUMMARY OF INVENTION

Technical Problem

However, in order to achieve both of the loss reduction and the differential driving in a region exceeding 50 giga baud rate, some disadvantages are caused in the conventionally-reported configurations. For example, NPL 2 uses a configuration as in FIG. 1 in which light is inputted or outputted in the same direction as the waveguide stripe (elongation) direction of the modulation region and a high-frequency input signal is supplied from a side face of the modulation element and is bent by about 90 degrees within an extension wiring of the element to supply power to a modulation region. This configuration has a main disadvantage that a differential signal propagating within the above bent section causes differential transmission lines to have therebetween a skew as a propagation length delay, thus undesirably causing an in-phase signal component. This in-phase signal component not only causes a deteriorated frequency response characteristic but also has an influence on the crosstalk between IQ channels. Thus, the skew within the transmission line is desirably minimized to zero in order to drive the modulator with a differential signal. Specifically, the above transmission line is required to be designed in a straight manner. Due to this point, the configurations shown in NPL 2 and FIG. 1 are disadvantageous in realizing the modulation operation using a higher frequency (or a higher speed) by the differential driving.

On the other hand, the optical modulator having a configuration shown in FIG. 3 is disclosed in a report showing the solution of the above disadvantage. This configuration allows an inputted RF signal to be transmitted without being bent by constituting an optical waveguide by a semiconductor substrate to bend an optical input by 90 degrees. However, even the configuration of FIG. 3 has some disadvantages from the above-described viewpoint of the electrical loss of the modulator. For example, the high-frequency transmission line is roughly formed in a straight manner. However, an RF extension line 65 to a point at which electricity is supplied to a modulation region requires a length of at least 1.5 mm or more. The transmission line having a long length of a millimeter order undesirably causes a significantly-deteriorated modulation band because the RF propagation loss is remarkable during the above-described high baud rate driving.

The reason of the increased transmission line length is that the optical circuit requires the length of an optical splitter itself and the area proportionally required by the length of the bent waveguide. For example, a compound semiconductor optical modulator requires a bend radius of about 150-300 µm. However, in order to branch one optical waveguide to increase the interval between the branched waveguides to a desired channel interval generally in a range from several hundred µm to 1 mm, a circuit area corresponding to a length of about 500 µm or more is required in the longer side direction between channels including an MMI optical coupler and a serpentine curve waveguide. A polarization multiplexing-type IQ optical modulator is configured so that at least three optical splitters are integrated in series. Thus, how to reduce the area and the RF extension line is important in realizing a higher speed.

On the other hand, the optical modulation circuit design mainly requires the consideration of (1) the optical circuit isometry design, (2) the (electrical) skew between channels, (3) the high frequency line length, and (4) the chip area for example. The present inventors have examined a configuration to be used based on these viewpoints. First, in the case of the configuration shown in FIG. 1, the RF extension line includes therein the 90-degree-bend transmission line as described above. Thus, possible concerns in this case include the skew undesirably caused between differential transmission lines and different RF extension line lengths between channels also may cause the modulation characteristic to depend on the channels. Therefore, this configuration cannot be adopted because this configuration inevitably requires the bent RF transmission line.

FIG. 3 shows a method of supplying an input signal in a straight manner without causing a bent RF transmission line that is most compatible with the configuration of FIG. 1 for example. This configuration satisfies the above requirements of (1) the optical circuit isometry design and (2) the skew between channels. However, this configuration requires the increased area of an optical demultiplexer including the serpentine curve waveguide and thus requires (4) an increased chip area and (3) the unnecessary increase of the high frequency line length. Thus, this configuration also cannot be adopted.

Thus, the present inventors have paid attention on the input-side optical splitter in order to find a design that can minimize RF extension line length. Specifically, the present inventors found a concept that a disadvantage of the unnecessary-long RF extension line length may be caused, as shown in FIG. 3, by splitters formed in the same direction as that of the stripe direction of the optical waveguide constituting a child MZM including a modulation part. To solve this, the present inventors considered that the RF extension line length can be prevented from being increased by forming all of these optical splitters in a direction vertical to the waveguide stripe direction of the modulation part. However, as can be seen from FIG. 4, it was found that, when all of the optical splitters were formed in a direction vertical to the optical waveguide stripe direction of the modulation part of the child MZM, the skew between channels, and chip area for example were increased despite of the intention. Furthermore, a design providing the minimized RF extension line length is not sufficiently achieved by the configuration as shown in FIG. 5 in which only the input direction of the RF extension line matches the stripe direction of the optical waveguide.

Through the keen efforts as described above, the inventors have reached the present invention by finding such an IQ optical modulator that has an optimized functional block layout of an optical circuit, and that provides the stripe direction of the input-side high-frequency transmission line in the same direction as the waveguide stripe direction of the optical modulator, to thereby supply a differential input signal to an optical modulation unit with a reduced skew and a reduced loss, thus providing a higher modulation speed. An objective of the present invention is to provide an IQ optical modulator that can be operated with a high-speed over a wide band.

Solution to Problem

In order to achieve the above objective, one embodiment of the invention provides an IQ optical modulator, comprising: a Mach-Zehnder type (MZM) optical waveguide functioning as a parent; MZM optical waveguides functioning as a child that constitute each two arms of the parent MZM optical waveguide; two electrode transmission lines that are provided along the two arms constituting the child MZM optical waveguides, respectively, and that receive a modulation signal to thereby phase-modulate an optical signal propagating in the MZM; an RF extension line that is connected to the two electrode transmission lines, respectively, and that is used to input the modulation signal applied to the two electrode transmission lines; a first optical splitter for branching light into the two arms of the parent MZM optical waveguide; a second optical splitter for branching light into the two arms of the child MZM optical waveguide; and a first optical multiplexer for multiplexing light from the two arms of the child MZM optical waveguide. The child MZM optical waveguide including the two electrode transmission lines has a stripe direction that is the same as the stripe direction of the RF extension line, the same as the stripe direction of the second optical splitter, and the same as the stripe direction of the first optical multiplexer, and that is orthogonal to the stripe direction of the first optical splitter.

DESCRIPTION OF EMBODIMENTS

Figure 1:
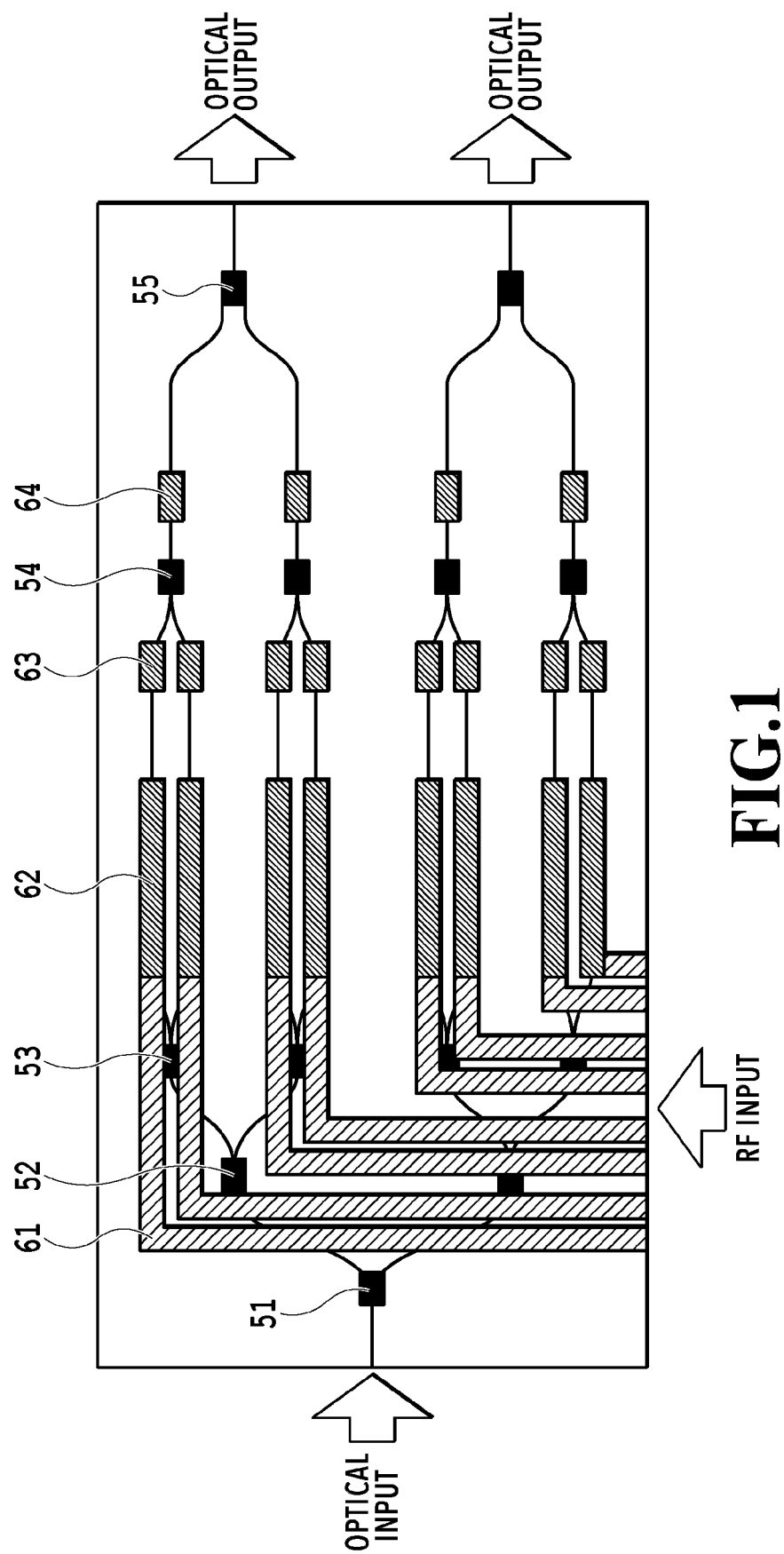
FIG. 1 illustrates an example of a conventional polarization multiplexing-type IQ optical modulator.
Figure 2:
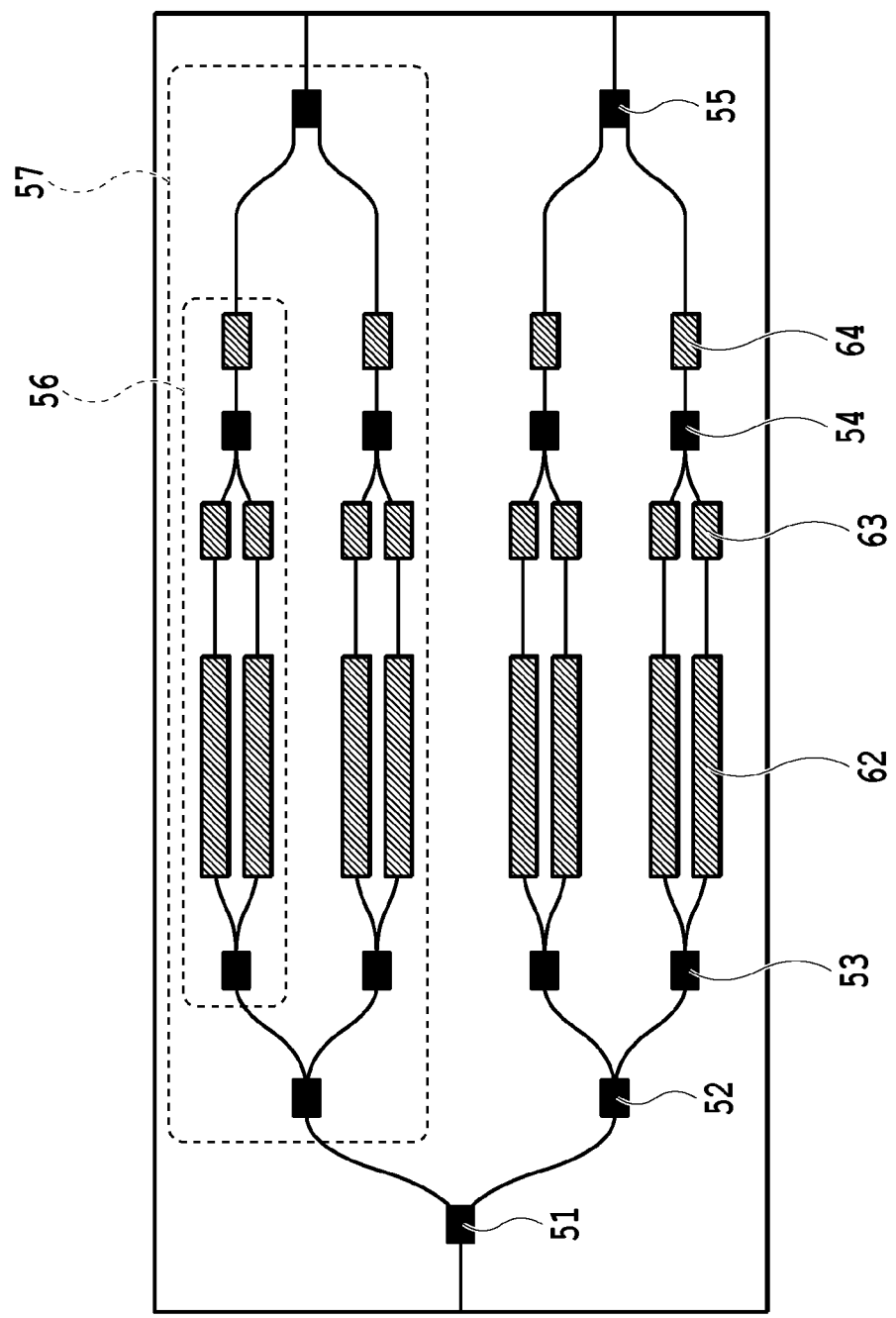
FIG. 2 illustrates the optical waveguide structure of the polarization multiplexing-type IQ optical modulator of FIG. 1.

With reference to the attached drawings, the following section will describe an embodiment of the present invention. In this specification and the drawings, component having the same reference numerals denote the same or similar parts.

Figure 6:
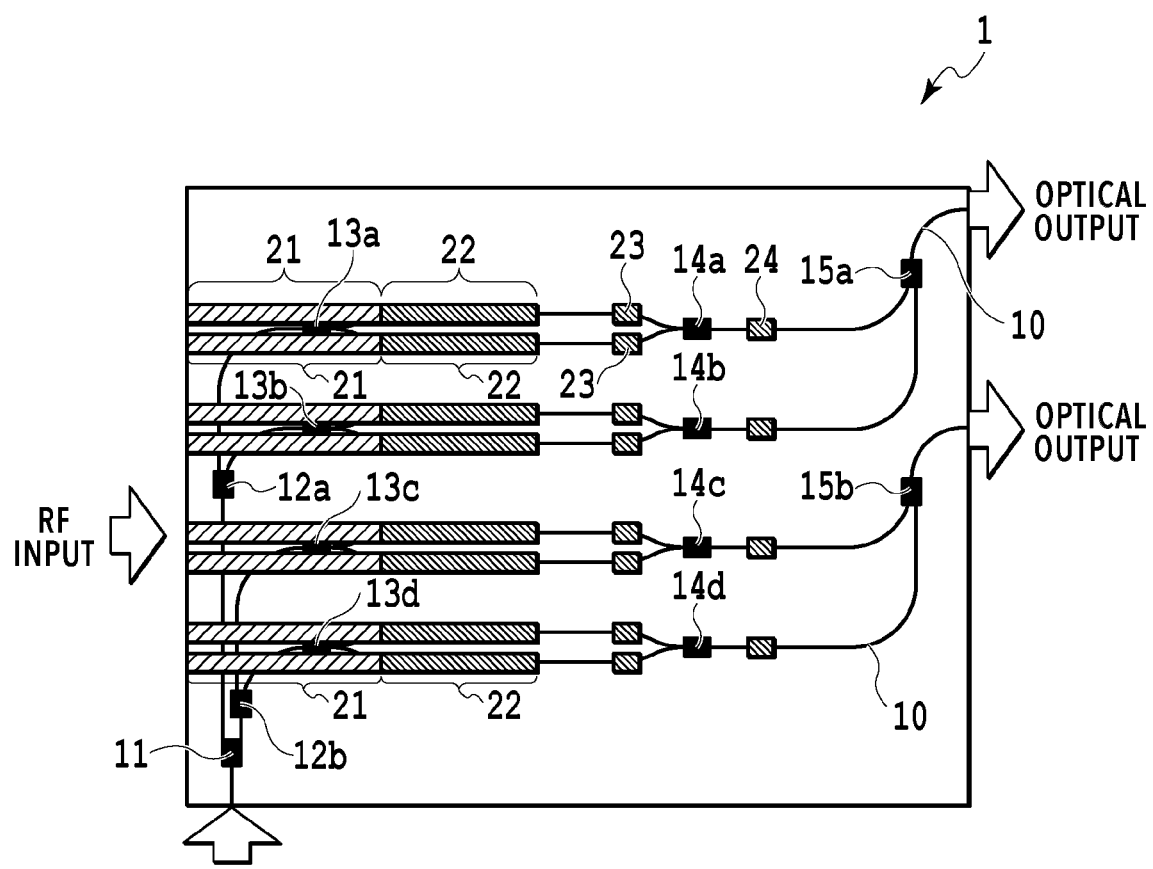
FIG. 6 illustrates an example of the polarization multiplexing-type IQ optical modulator of this embodiment.
Figure 7:
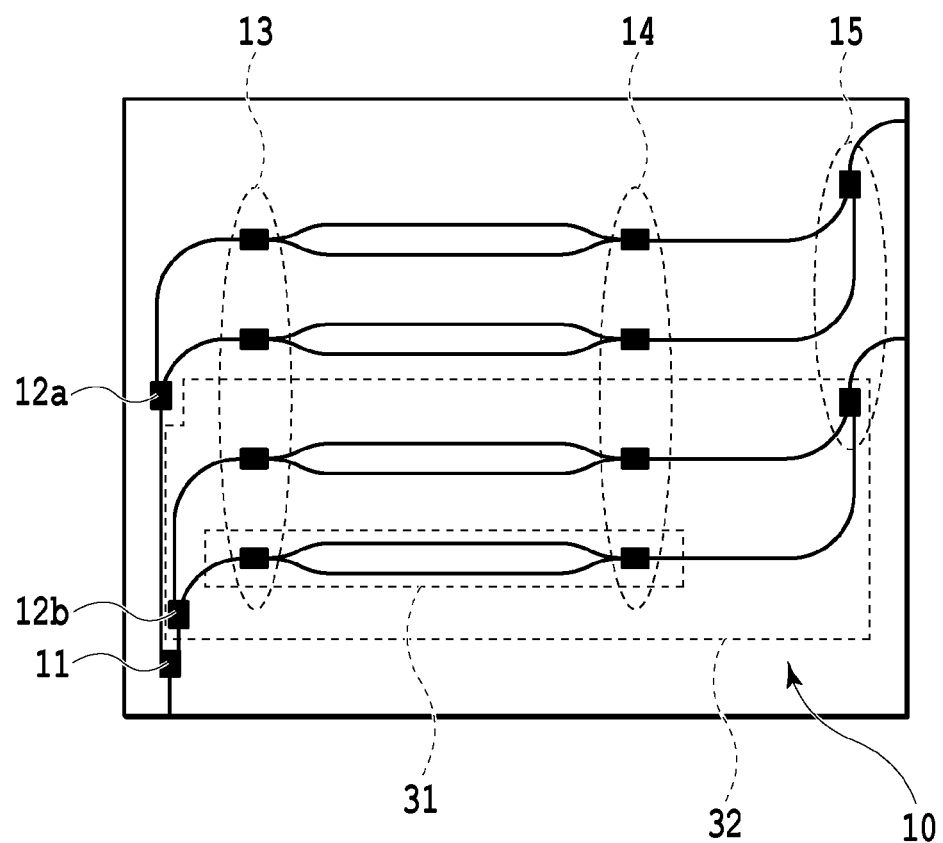
FIG. 7 illustrates the optical waveguide structure of the polarization multiplexing-type IQ optical modulator of FIG. 6.

FIG. 6 illustrates a configuration example of the polarization multiplexing-type IQ optical modulator of this embodiment. FIG. 7 is a partial view illustrating the configuration of the optical waveguide part of the polarization multiplexing-type IQ optical modulator of FIG. 6. The polarization multiplexing-type IQ optical modulator 1 of this embodiment is configured so that an optical waveguide 10 has thereon an RF extension line 21, a phase modulation electrode transmission line 22, the first electrode 23 for phase adjustment, and the second electrode 24 for phase adjustment.

The optical waveguide 10 includes: an XY polarized wave separation optical splitter 11 for separating an inputted optical signal to an X polarized wave and a Y polarized wave to output these polarized waves separately; the first optical splitters 12 (12a, 12b) that are provided in an optical waveguide in which the X polarized wave is propagated and an optical waveguide in which the Y polarized wave is propagated, respectively, to further branch each of these polarized waves to two waves; the second optical splitters 13 (13a, 13b, 13c, 13d) for further branching each of polarized waves divided to two waves; and in contrast with these splitters 12 and 13, includes the first multiplexer 14s (14a, 14b, 14c, 14d) configured to multiplex light propagating in two adjacent optical waveguides, and the second multiplexers 15 (15a, 15b) for further multiplexing light propagating in the adjacent optical waveguides multiplexed by the first multiplexer 14.

The polarization multiplexing-type IQ optical modulator of this embodiment includes a so-called nesting-type MZM optical waveguide structure, in which a region sandwiched between the second optical splitter 13 and the first optical multiplexer 14 functions as a child MZM (Mach-Zehnder interference-type) optical waveguide 31 (FIG. 7), and a region sandwiched between the first optical splitter 12 and the second optical multiplexer 15 functions as a parent MZM optical waveguide 32 (FIG. 7).

In the polarization multiplexing-type IQ optical modulator of this embodiment, the optical waveguide 10 can be formed in an InP compound semiconductor having a bend radius of about 200 μm for example. However, the optical waveguide 10 also may be provided on a substrate using other materials having an electro-optical effect (e.g., GaAs, Si, LiNbO3).

The phase modulation electrode transmission line 22 can have an electrode configuration of a distributed constant-type traveling wave electrode such as a coplanar strip transmission line. For example, in order to achieve a higher-speed modulation operation, the traveling wave electrode can have a capacity loading-type electrode structure (see PTL 2 for example). The use of the differential signal is important in the polarization multiplexing-type IQ optical modulator of this embodiment. Thus, it does not matter whether or not differential signals are differential-coupled. The coplanar strip transmission line may be substituted with a coplanar transmission line such as GSG type. The phase modulation electrode transmission line 22 is preferably configured so that a differential signal can be applied by an electrode transmission line 22 and the RF extension line 21 connected to the electrode transmission line 22 configured by a differential coupling transmission line (coupling differential transmission line).

Figure 3:
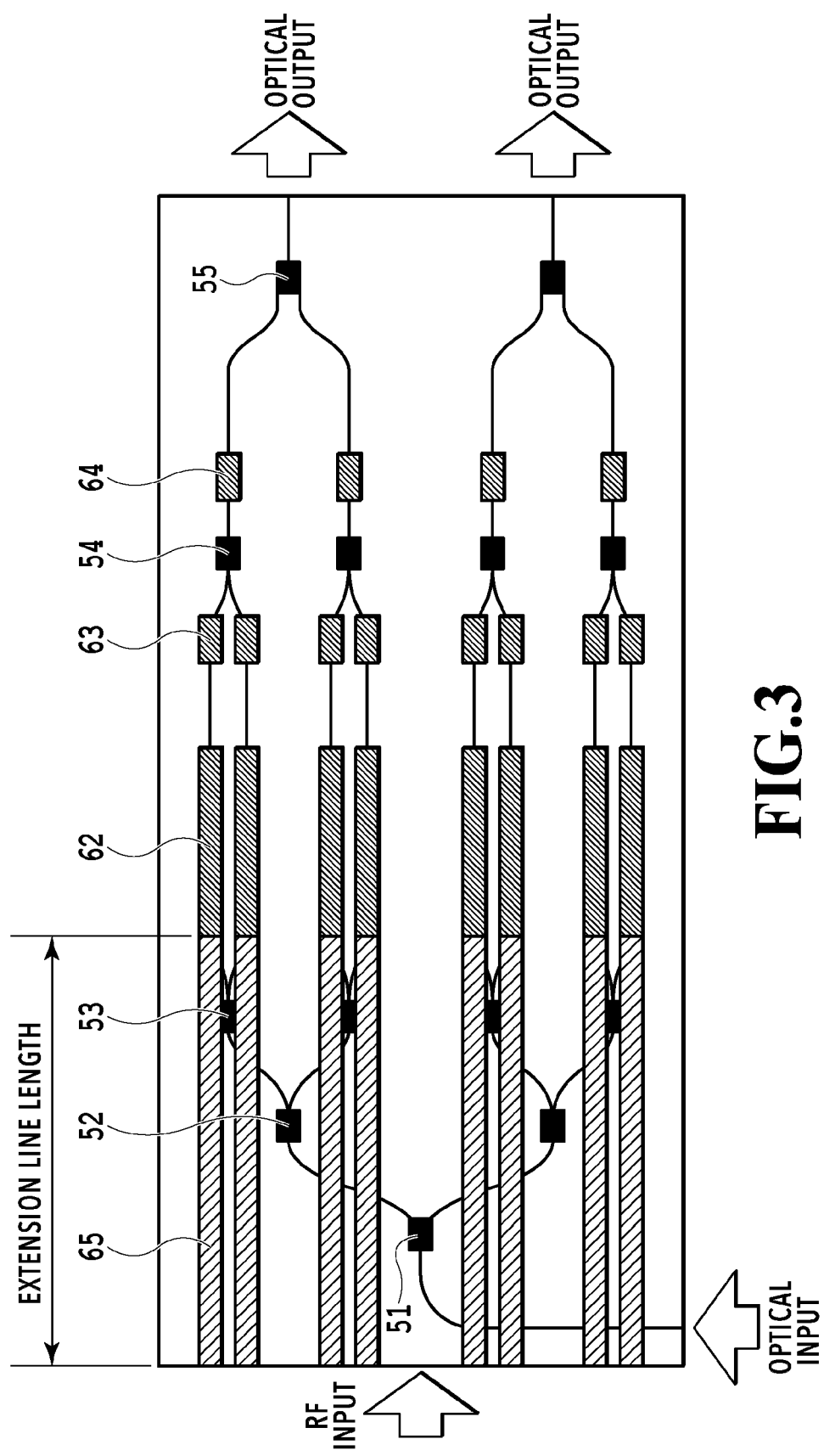
FIG. 3 illustrates another example of the conventional polarization multiplexing-type IQ optical modulator.
Figure 4:
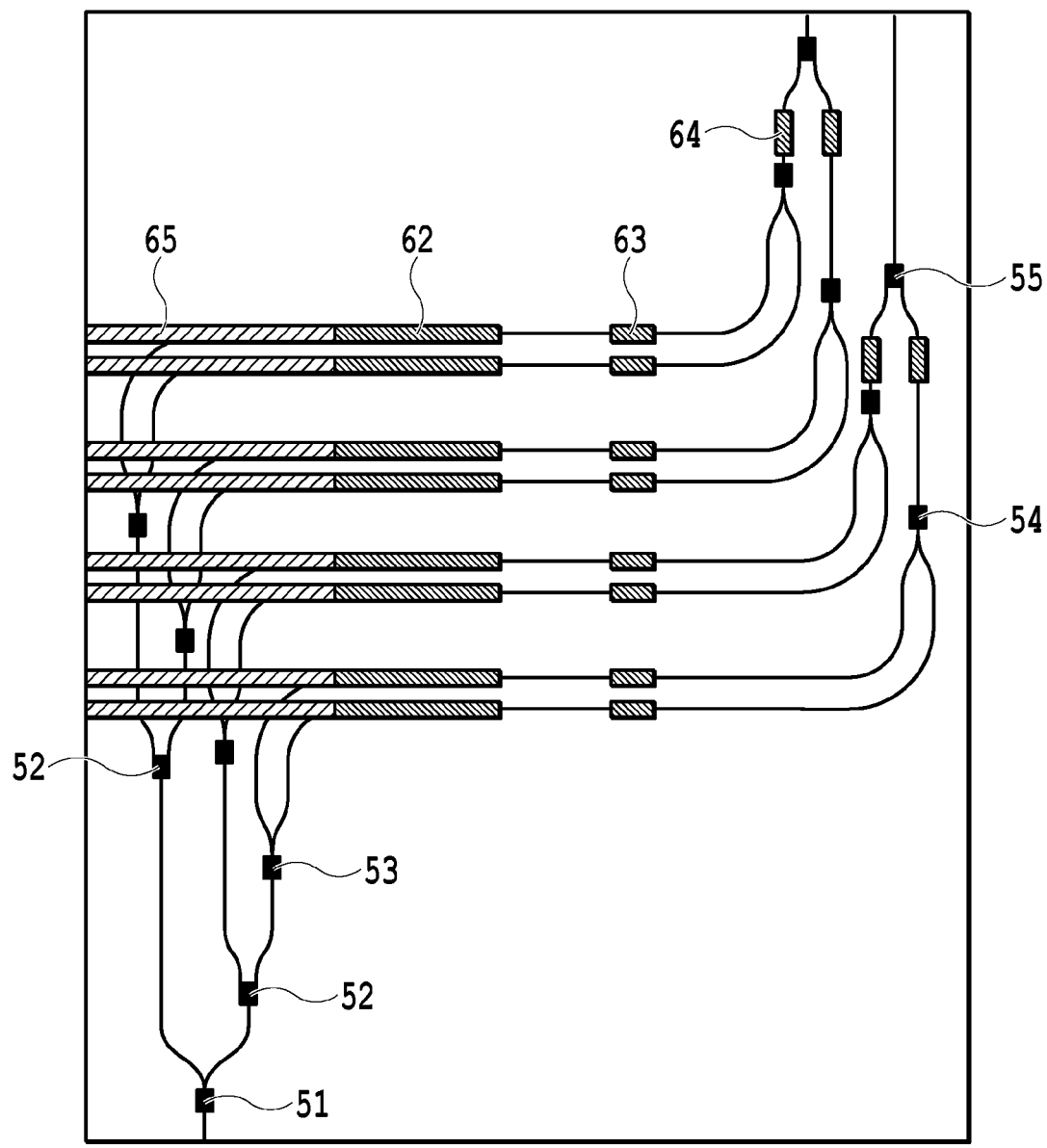
FIG. 4 illustrates another example of the conventional polarization multiplexing-type IQ optical modulator.

As shown in FIGS. 6 and 7, the polarization multiplexing-type IQ optical modulator of this embodiment is configured so that: (1) the RF extension line 21 connected to the phase modulation electrode transmission line 22 has a stripe (elongation) direction of the same direction as the stripe direction of the child MZM optical waveguide 31 functioning as an optical modulation unit, (2) the first optical splitter 12 has a stripe direction vertical to the stripe direction of the child MZM optical waveguide 31, and (3) the stripe direction of the second optical splitter 13 and the stripe direction of the first optical multiplexer 14 are configured to be in the same direction as the stripe direction of the child MZM optical waveguide 31. According to the calculation by the present inventors, the use of the configuration of this embodiment may allow, when compared with the conventional configuration shown in FIG. 3, the extension line length to be reduced by about 1 mm or more when assuming that a bend radius is 200 µm. The following section will further describe this configuration.

First, the following section will describe that (1) the RF extension line 21 connected to the phase modulation electrode transmission line 22 has a stripe direction in the same direction as the stripe direction of the child MZM optical waveguide 31 functioning as an optical modulation unit. The child MZM optical waveguide has thereon the phase modulation electrode transmission line 22 connected to the RF extension line 21. The electrode transmission line 22 provided in each child MZM receives a high-frequency signal from the RF extension line 21 to thereby generate an electro-optical effect, thus modulating an optical signal propagating in the optical waveguide. The high-frequency signal received from this RF extension line 21 is a differential input signal, thereby providing optical modulation of a high energy efficiency. The RF extension line 21 has a stripe direction of the same direction as the child MZM optical waveguide 31. This can consequently suppress the skew in the differential signal. In an actual case however, a signal transmission line for outputting an RF signal is also provided at an opposite side of the RF extension line 21 of the electrode transmission line 22 but is omitted here in FIG. 6 because any configuration may be used so long as the configuration can output a signal to the exterior.

In the above configuration of (1), as shown in FIG. 6, the RF extension line 21 must have a stripe direction in the same direction as the stripe direction of the phase modulation electrode transmission line 22. A desired configuration is that all channels have parallel transmission lines formed in a straight manner. It is noted that the terms "straight" and "the same direction" do not require geometrically-strict linearity or sameness. They mean the linearity and sameness compared in an inputted high-frequency signal (microwave) wavelength. Thus, even when the RF extension line 21 includes a waveguide that is slightly bent (or that has a bend angle of about 30° or less) for example, there is no problem so long as the influence by the skew between differential transmission lines can be ignored from the viewpoint of microwaves.

Figure 5:
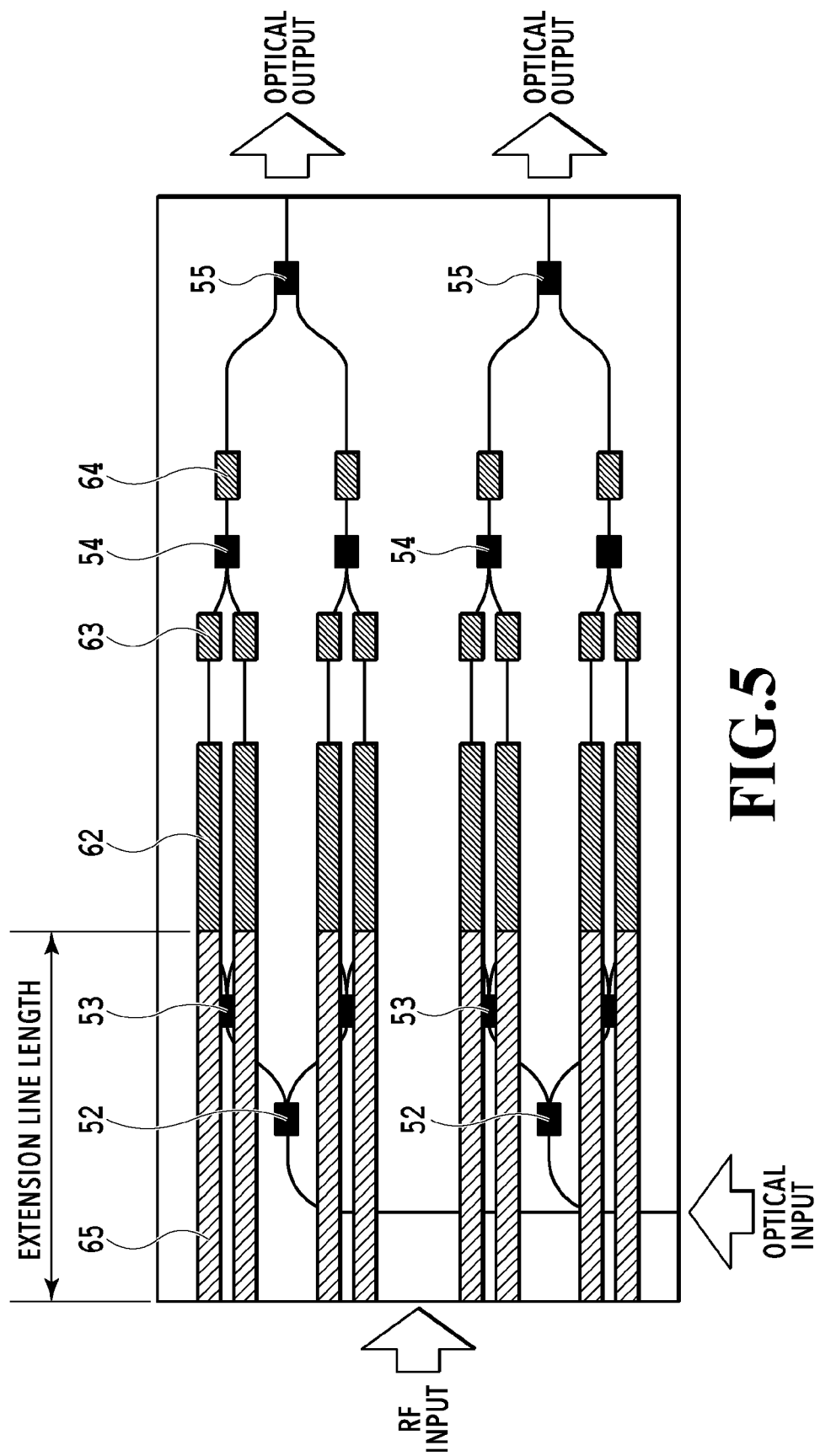
FIG. 5 illustrates another example of the conventional polarization multiplexing-type IQ optical modulator.

Next, the following section will describe (2) the first optical splitter 12 has a stripe direction vertical to the stripe direction of the child MZM optical waveguide 31 (which also may be called an orthogonality relation). FIG. 5 shows a configuration in which the first optical splitter 12 has a stripe direction in the same direction as the stripe direction of the child MZM optical waveguide 31. These same stripe directions are not preferable from the viewpoint of suppressing the skew because the RF extension line 21 having an increased length is caused.

Next, the following section will describe (3) the stripe direction of the second optical splitter 13 and the stripe direction of the first optical multiplexer 14 are in the same direction as the stripe direction of the child MZM optical waveguide 31. If the above configuration of (3) is not used and another configuration in which the child MZM includes therein a bent waveguide is used instead, the waveguide is needed to have an arm length longer than the length required for the optical modulation. Thus, a deteriorated modulation characteristic may be caused due to the manufacturing or machining process error or a long-term variation by the external environment. For example, the tendency to induce a high-order propagation mode may be caused, leading to a concern such as an unbalance between arms. On the other hand, the above configuration of (3) can suppress the RF extension line from having an increased length because the child MZM 31 having a short arm interval allows the optical splitter 13 and optical multiplexer 14 to be manufactured with a small size, even when the child MZM optical waveguide 31 as well as the optical splitter 13 and optical multiplexer 14 having therebetween the child MZM optical waveguide 31 are formed in the same stripe direction.

Figure 8:
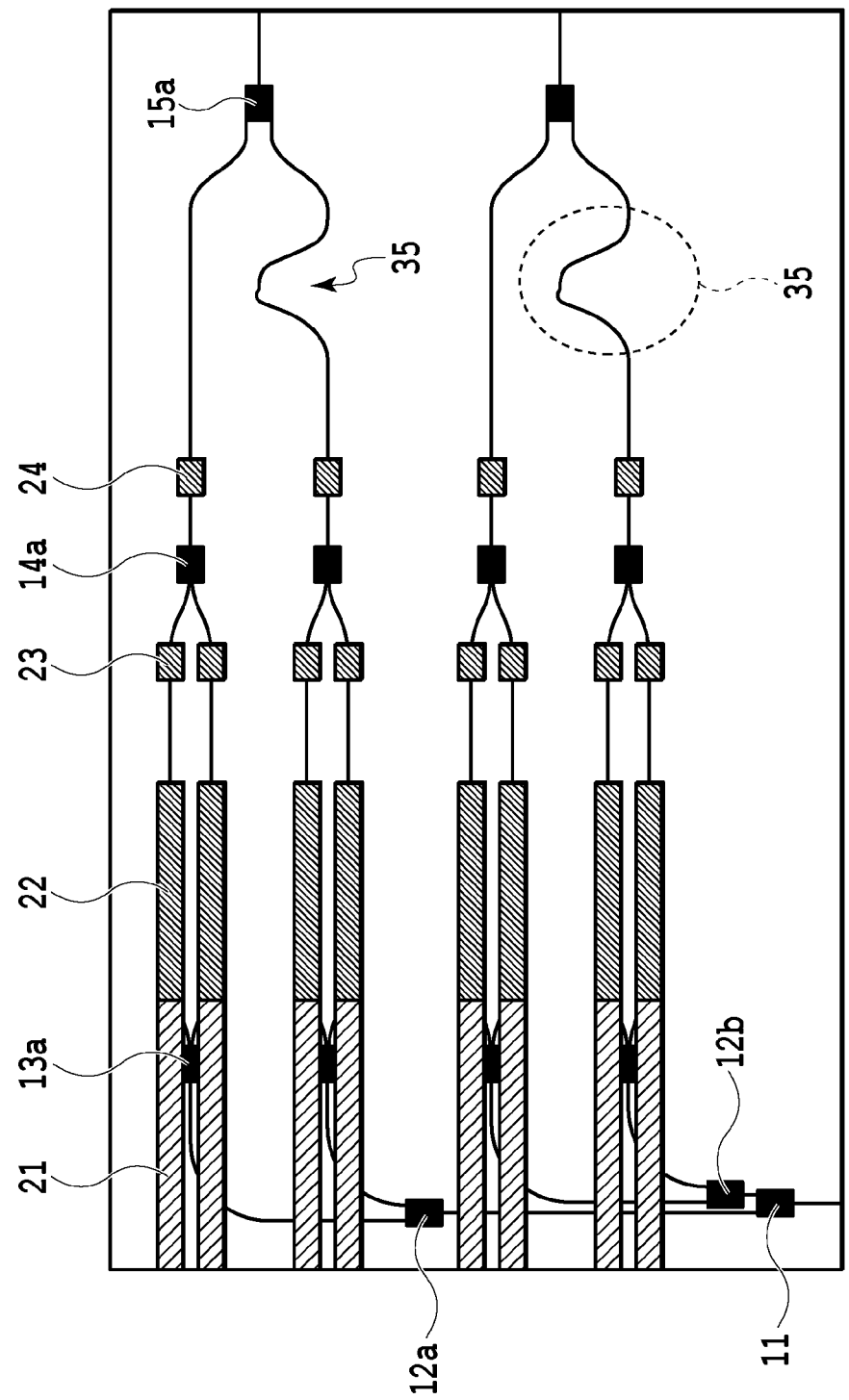
FIG. 8 illustrates another example of the polarization multiplexing-type IQ optical modulator of this embodiment.

The MZ interference type optical circuit inevitably requires the isometric waveguide between arms for wideband operation. Thus, when the first optical splitter 12 has a stripe direction formed in a direction vertical to the stripe direction of the child MZM optical waveguide 31, the isometric parent MZM circuit of a small size can be realized, by similarly forming as shown in FIGS. 6 and 7. The second optical multiplexer 15 having a stripe direction formed in a direction vertical to the stripe direction of the child MZM optical waveguide 31. However, by a configuration as shown in FIG. 8 in which the parent MZM optical waveguide 32 includes therein a delay optical circuit 35 for example, MZ arm length of the parent MZM 32 can be made isometric, and the second optical multiplexer 15 can be formed, without causing the RF extension line 21 having an increased length, to have a stripe direction in the same direction as the stripe direction of the child MZM optical waveguide 31. However, from the viewpoint of a chip area for example, the configurations as shown in FIGS. 6 and 7 are desired in which the second optical multiplexer 15 has a stripe direction formed in a direction vertical to the stripe direction of the child MZM optical waveguide 31.

Regarding the XY polarized wave separation optical splitter 11 provided at an optical input end, there is no limit on the stripe direction. Thus, no influence is caused upon the length of the RF extension line 21 and only small influence is caused upon the optical isometry and interference conditions for example, even when the XY polarized wave separation optical splitter 11 is formed in an arbitrary direction depending on the circuit configuration of the entire polarization multiplexing-type IQ optical modulator 1.

The directions along which light is inputted to or outputted from the optical waveguide 10 are not particularly limited. Thus, in addition to the configurations as shown in FIGS. 6 and 7 in which light is inputted from an end face along the longer side direction of the elements of the polarization multiplexing-type IQ optical modulator 1, light also may be inputted from the end face along the element shorter side direction.

Figure 9:
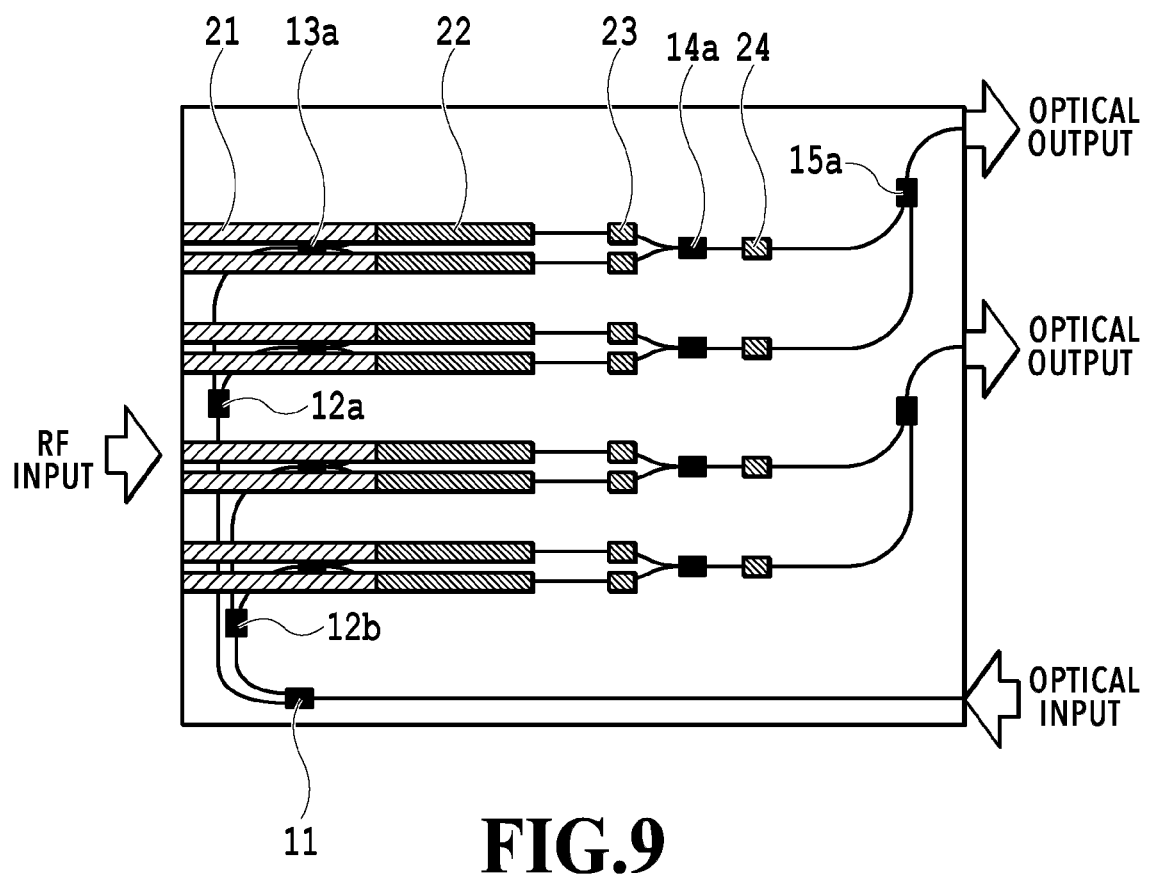
FIG. 9 illustrates another example of the polarization multiplexing-type IQ optical modulator of this embodiment.

Similarly, light may be outputted from a side face along the longer side direction of the elements as shown in FIG. 9 instead of being outputted from the end face along the shorter side direction of the elements as shown in FIGS. 6 and 7.

In the above-described embodiment, for the purpose of detailed description, the polarization multiplexing-type optical modulator has been described that is obtained by integrating parent MZMs in two parallel rows (i.e., child MZMs in four parallel rows). However, the present invention also can be applied to another configuration in which the IQ modulator using only single polarization is obtained by integrating one parent MZM (i.e., child MZMs in two parallel rows).

According to the polarization multiplexing-type IQ optical modulator of this embodiment, a plurality of optical multiplexers/splitters provided in a multistage manner are allowed to have an optimized layout and a high-frequency signal is inputted in a direction in the same direction as the waveguide direction of the optical modulation region. This can consequently provide a differential input signal to a modulation electrode with a reduced loss and a reduced skew, thus achieving a higher modulation speed.

Figure 10:
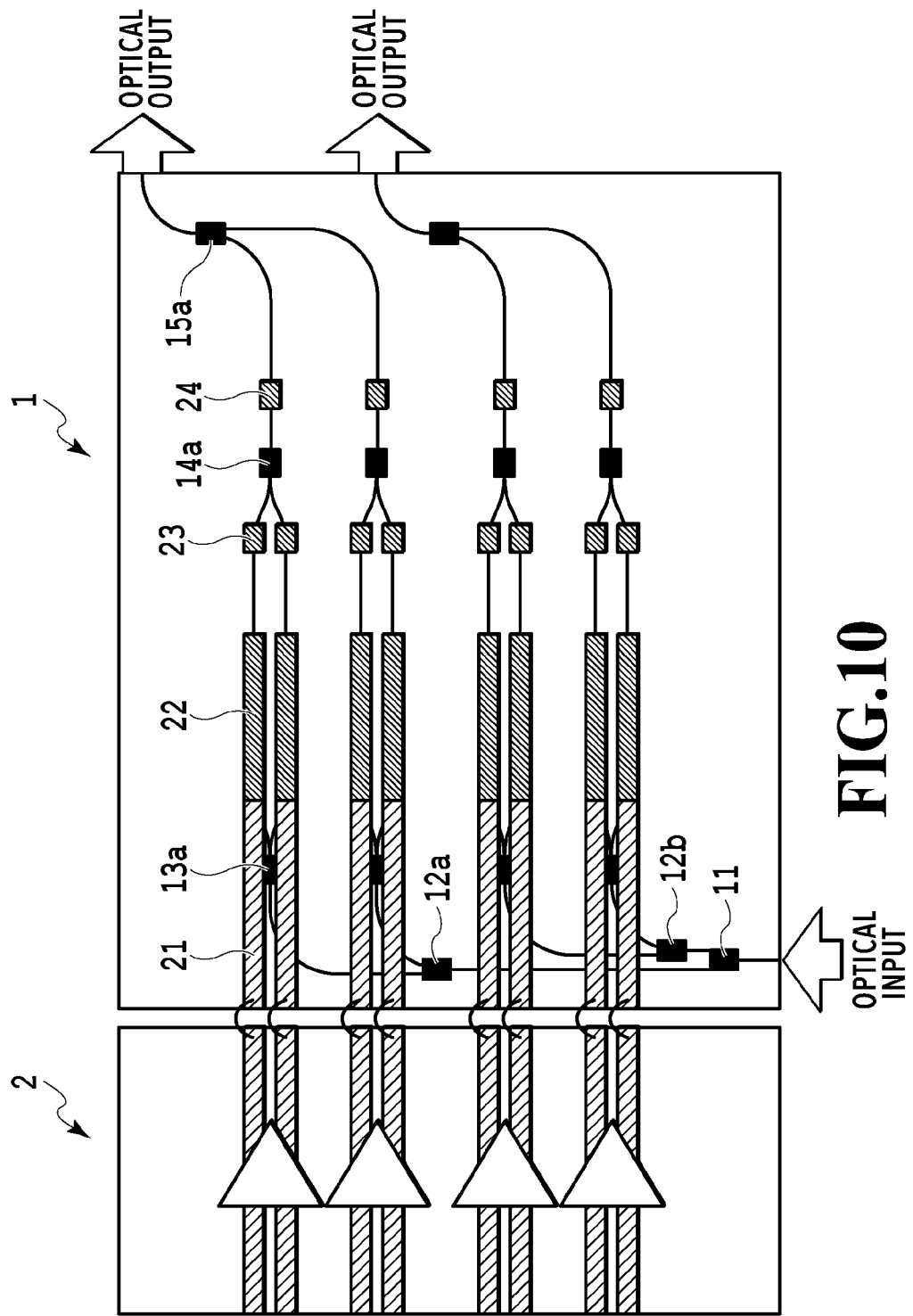
FIG. 10 illustrates a example of the polarization multiplexing-type IQ optical modulator of this embodiment, which is integrated with a differential output driver amplifier.

FIG. 10 illustrates a configuration example in which the polarization multiplexing-type IQ optical modulator 1 of this embodiment and the differential output driver amplifier 2 are directly connected and integrated. As shown in FIG. 10, the polarization multiplexing-type IQ optical modulator 1 of this embodiment is preferably integrated with the differential output driver amplifier 2 for inputting a differential signal for driving a modulator in an integrated one package. The differential output driver amplifier integrated with the optical modulator in an integrated one package provides mainly two advantages. One of the two advantages is that the high-frequency wiring can have a reduced length. This can provide the elimination of the wiring between packages, thus providing a possibility of a significantly-reduced transmission line loss.

The other advantage is that the driver output side can have an arbitrarily-defined characteristic impedance. Generally, the interface between packages requires a differential 100Ω (single 50Ω) RF connector. Thus, the driver output must be set with a characteristic impedance of differential 100Ω. On the other hand, the differential output driver amplifier integrated with the modulator does not require an interface connector therebetween, thus providing a driver design matching the characteristic impedance of the modulator. Generally, in order to provide an optical modulator having a wider band, the characteristic impedance is undesirably caused to be lower than the differential 100Ω. Thus, a significant advantage is obtained by the matching between the reduced characteristic impedance and the driver output-side characteristic impedance.

As described above, differential output drivers are desirably integrated within the same one package in order to allow the polarization multiplexing-type IQ optical modulator of this embodiment to have a higher speed and to maximize the effect by a reduced power consumption.

As shown in FIG. 10, when the polarization multiplexing-type IQ optical modulator 1 of this embodiment and the differential output driver amplifier 2 are directly connected and integrated, the feed end termination resistance may be omitted that must be generally included in the amplifier. This can consequently provide a possibility of a further-improved energy efficiency (or lower power consumption).

Although it is known that the termination resistance can be omitted only by the integration with the modulator as disclosed in NPL 3, omitting the feed end termination resistance means that output of the differential driver amplifier 2 is having no resistance against the electroreflection from the polarization multiplexing-type IQ optical modulator 1.

Specifically, if a high-frequency signal transmission line extending from the output of the differential output driver amplifier 2 to the termination resistance of the polarization multiplexing-type IQ optical modulator 1 includes therein a reflecting point (e.g., a point having mismatched characteristic impedances), a signal reflected therefrom is allowed to return to the driver circuit in the differential output driver amplifier 2 without experiencing a significant attenuation, which may cause a risk of the driver having a reduced driving force or an amplified signal having a deteriorated quality.

In order to eliminate this disadvantage, the reflecting point between the driver and the modulator termination may be excluded. As shown in FIG. 10, one of the most effective means is to eliminate, an unnecessary development or relay board such as ceramic between the driver and the modulator so that the direct electrical connection to the modulator by a gold wire can be achieved.

The polarization multiplexing-type IQ optical modulator 1 of this embodiment allows the RF extension line 21 to have the minimized configuration. Thus, the direct connection between the polarization multiplexing-type IQ optical modulator 1 and the differential output driver amplifier 2 not only can achieve the reduced reflecting points but also can provide the transmission line having a shorter length leading to the reduction of the high frequency line loss.

REFERENCE SIGNS LIST

1 Polarization multiplexing-type IQ optical modulator
2 Differential output driver amplifier
10 Optical waveguide
11 XY polarized wave separation optical splitter
12, 12a, and 12b First optical splitter
13, 13a, 13b, 13c, and 13d Second optical splitter
14, 14a, 14b, 14c, and 14d First multiplexer
15, 15a, and 15b Second multiplexer
21 RF extension line
22 Electrode transmission line
23 First electrode
24 Second electrode
31 Child MZM optical waveguide
32 Parent MZM optical waveguide
35 Delay optical circuit
51 XY polarized wave separation optical splitter
52 First optical splitter
53 Second optical splitter
54 First multiplexer
55 Second multiplexer
56 Child MZM
57 Parent MZM
62 Traveling wave-type electrode
63 DC electrode
64 DC electrode
65 RF extension line

The invention claimed is:

1. An IQ optical modulator, comprising:
a parent Mach-Zehnder type (MZM) optical waveguide functioning as a parent;
child MZM optical waveguides functioning as a child that constitute two arms of the parent MZM optical waveguide;
two electrode transmission lines that are provided along two arms of the child MZM optical waveguides, respectively, and that receive a modulation signal to thereby phase-modulate an optical signal propagating in the child MZM optical waveguides;
an RF extension line that is connected to the two electrode transmission lines, respectively, and that is used to input the modulation signal applied to the two electrode transmission lines;
a first optical splitter for branching light into the two arms of the parent MZM optical waveguide;
second optical splitters for branching light into the two arms of the child MZM optical waveguides;
first optical multiplexers for multiplexing light from the two arms of the child MZM optical waveguides,
wherein:
the child MZM optical waveguides including the two electrode transmission lines has a stripe direction that is:

the same as a stripe direction of the RF extension line, a stripe direction of the second optical splitter, and a stripe direction of the first optical multiplexer, and orthogonal to a stripe direction of the first optical splitter; and a second optical multiplexer for multiplexing light from the two arms of the parent MZM optional waveguide, and wherein the stripe direction of the child MZM optical waveguides including the two electrode transmission lines is orthogonal to a stripe direction of the second optical multiplexer.

2. The IQ optical modulator according to claim 1, wherein:

the two electrode transmission lines and the RF extension line connected to the two electrode transmission lines are configured by a differential coupling transmission line, and a modulation signal applied from the RF extension line to the two electrode transmission lines is a differential signal.

3. The IQ optical modulator according to claim 1, wherein two parent MZM optical waveguides, which include the parent MZM optical waveguide, are integrated in a parallel manner within the same semiconductor element, the IQ optical modulator further comprising:

an XY polarized wave separation optical splitter for separating an optical signal for the input to the two parent MZM optical waveguides to an X polarized wave and a Y polarized wave to input the separated waves.

4. The IQ optical modulator according to claim 1, wherein:

a differential input/output-type high-frequency amplifier is provided in the same package as that of the IQ optical modulator, and the IQ optical modulator and the high-frequency amplifier are directly electrically connected only via a gold wire.

* * * * *